Oct. 14, 1952
P. RUSNAK
2,613,951
FOLDING UTILITY CART
Filed July 10, 1950
3 Sheets-Sheet 1
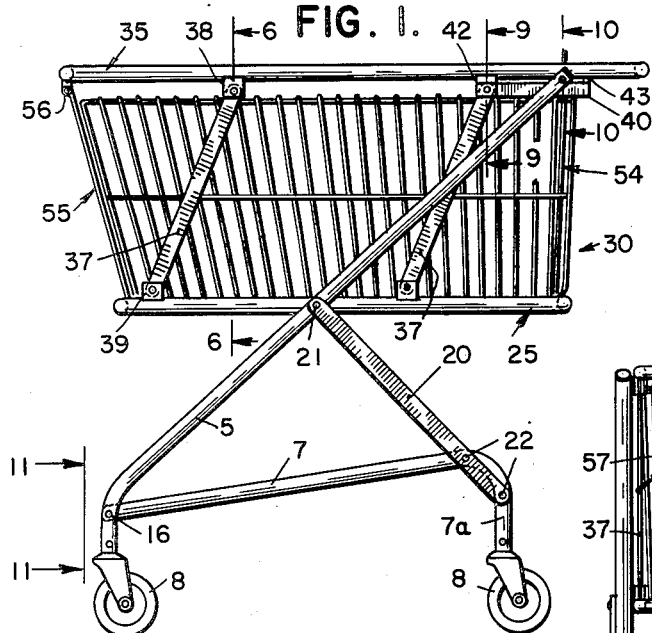
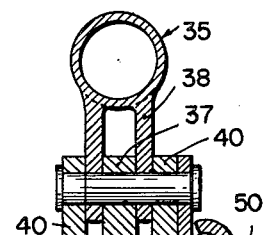
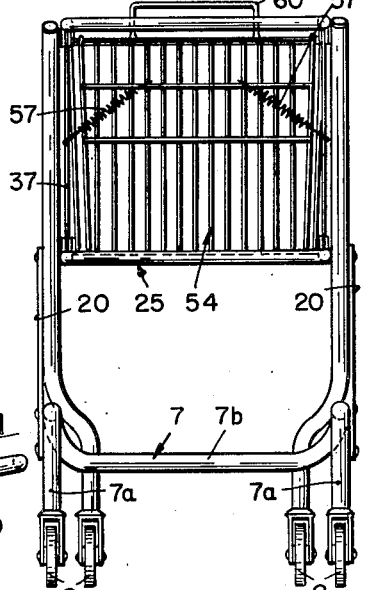
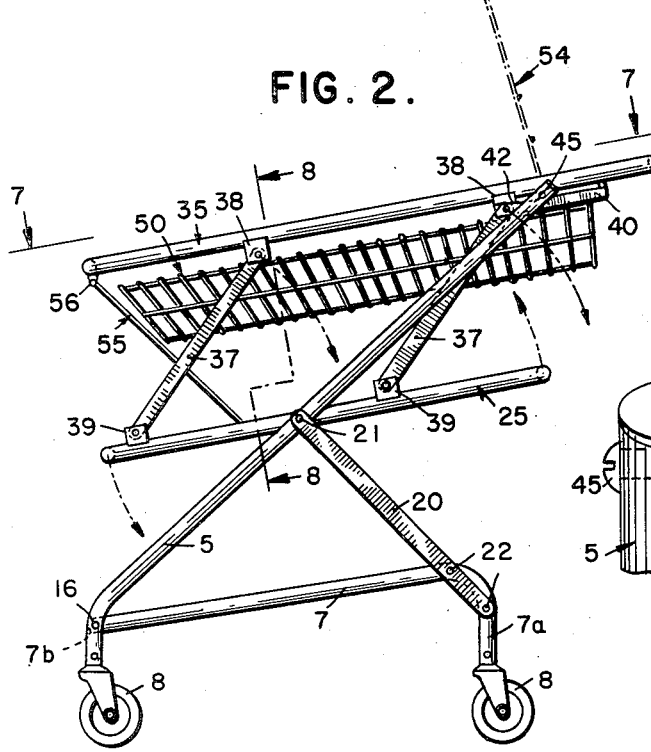
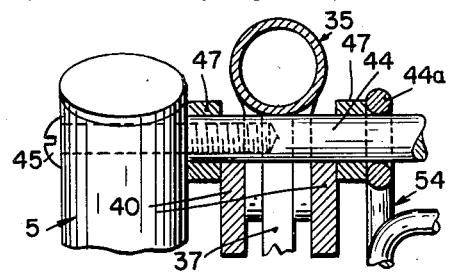
INVENTOR
PAUL RUSNAK
BY
ATTORNEYS Oct. 14, 1952 P. RUSNAK 2,613,951
FOLDING UTILITY CART
Filed July 10, 1950 3 Sheets-Sheet 2
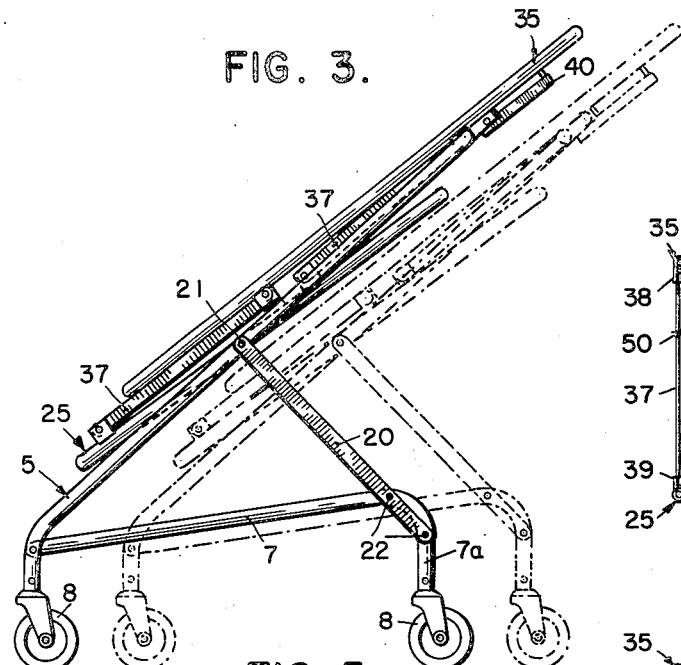
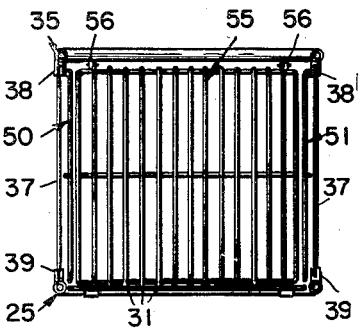
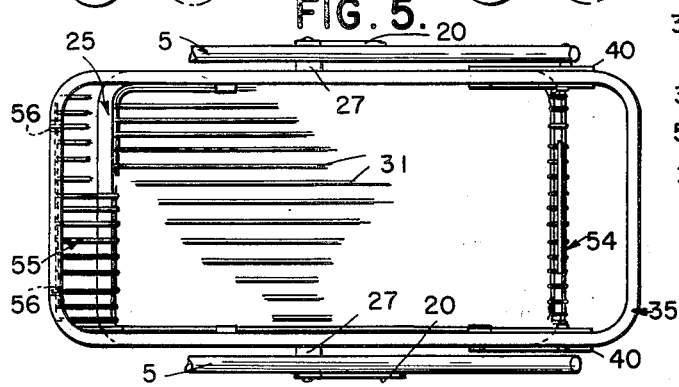
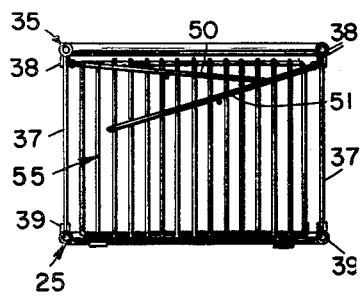
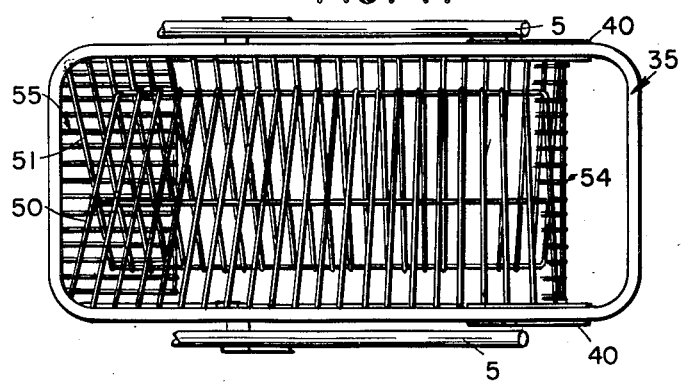
INVENTOR
PAUL RUSNAK
BY *Mason Graham*
ATTORNEYS Oct. 14, 1952 — P. RUSNAK — 2,613,951
FOLDING UTILITY CART
Filed July 10, 1950 — 3 Sheets-Sheet 3

INVENTOR
PAUL RUSNAK
BY
ATTORNEYS

Patented Oct. 14, 1952

2,613,951

UNITED STATES PATENT OFFICE 2,613,951

FOLDING UTILITY CART

Paul Rusnak, Los Angeles, Calif.

Application July 10, 1950, Serial No. 172,947

14 Claims. (Cl. 280—36)

My invention has to do with utility carts and relates more particularly to a folding cart utilizing, as a unitary part thereof, a basket for carrying any desired object or objects.

It is an object of the invention to provide a utility cart which is economical of manufacture, efficient in use an which may be easily folded or collapsed, easily unfolded or set up, and which may be nested when in folded position.

Another object is to provide a cart of this sort which is characterize by its substantial durability.

A further object is to provide a utility cart which, when not in use, occupies a minimum of space but which, when in use, provides maximum space for receiving articles to be transported.

Other objects will appear as the following description of presently preferred embodiments of the invention proceeds, for the purposes of which description I shall now refer to the accompanying drawings, wherein:

Fig. 1 is a side elevation of my cart in set-up position ready for use;

Fig. 2 is a side elevation of a cart in course of being folded;

Fig. 3 is a side elevation showing the cart in folded position and illustrating how a plurality of carts may be nested;

Fig. 4 is a rear end elevation of the device in the position of Fig. 1;

Fig. 5 is a top plan view of the device as shown in Fig. 1;

Fig. 6 is a section taken on line 6—6 of Fig. 1;

Fig. 7 is a top plan view taken on line 7—7 of Fig. 2;

Fig. 8 is a section taken on line 8—8 of Fig. 2;

Fig. 9 is an enlarged section taken on line 9—9 of Fig. 1;

Fig. 10 is an enlarged section taken on line 10—10 of Fig. 1;

Figure 11:
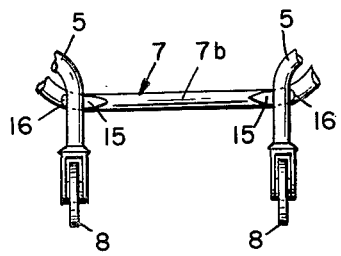
Fig. 11 is a fragmentary view taken on line 11—11 of Fig. 1.

Referring now to the drawings, I show in Figs. 1-11 an embodiment of the invention comprising a frame having parallel diagonally upwardly extending side frame members 5. To those members, adjacent their bottom ends, I fix a U-shaped base frame 7 whose free end portions 7a extend downwardly. Casters 8 are rotatably mounted in the lower ends of the frame members 5 and 7a. The side portions of the base frame 7 diverge toward their right or rear ends to permit of nesting of several carts as will be hereinafter described.

The frame members described are preferably made of tube stock and the cross-portion 7b of the U-shaped base frame is secured to the members 5 by means of a sleeve 15 disposed axially of the cross-portion 7b and by screws 16 which extend through the members 5 and are threaded into the respective ends of the sleeves (see Fig. 11.)

A pair of brace members 20 are fixed at their respective ends to the frame members 5 and 7 by screws 21 and 22.

A rectangular frame 25 is pivotally mounted between members 5 intermediate the ends of the latter by means of pintle 27 into which screws 21 are threaded at their inner ends so that the frame may swing relative to members 5. This frame forms the bottom frame of a basket 30 and carries longitudinal grill bars 31 providing a floor. A rectangular top frame 35 of the basket is pivotally supported from the bottom frame 25 by links 37, each of which is pivotally connected at its respective ends to brackets 38, 39 carried by the top and bottom frames respectively.

A guide bar 40 is suspended from and extends parallel with frame 35, there being one of these bars at each side of the frame. The suspension of each of the guide bars is effected by means of brackets 42, 43. A cross-bar 44 is connected at its ends to the top ends of the frame members 5 by means of screws 45. (Fig. 10.) This cross-bar slides along the guide bar during the folding and unfolding operation to be described, there being guide rings or washers 47 mounted on the cross-bar at each side of each guide bar 40.

Slide grills 50, 51 are swingably suspended from brackets 38 so as to swing between the upright position of Fig. 1 and the horizontal position which they assume when the basket is fully folded. (Fig. 3.)

Rear end grill 54 is swingably suspended from the cross-bar 44 by loops 44a, to swing upwardly and downwardly, and front end grill 55 is swingably suspended from brackets 56 carried by the front end portion of frame 35.

The rear end grill 54 is resiliently connected to the side grills 50, 51 by means of coil springs 57, for the purposes to be described.

The significance and functions of the described parts will become more apparent from the following description of operation:

Commencing with the set-up position of Fig. 1, in order to fold the basket, the operator simultaneously presses downwardly on the front end of the top frame 35 and swings the rear end grill 54 upwardly (Fig. 2), which can be done by pressing downwardly on the handle 60 projecting from said grill and thus using the cross-bar 44 as a fulcrum. By swinging the rear end grill into substantially upright position, the springs 57 partially swing the side grills inwardly and upwardly sufficiently to start them in their basket folding position, and continued downward pressure on the top frame 35 causes the links 37 to swing rearwardly and downwardly while the bottom edge of the front grill slides along the bottom grill 31 of the basket until the parts are in the fully folded position of Fig. 7. The parts are shown in intermediate position in Fig. 2. In folded position, several carts may be nested as shown in Fig. 3 since the side members of the U-shaped base members 7 diverge toward their rear ends.

To open or set up the basket from this folded position it is only necessary to lift the front portion of the top frame 35, which swings the top frame and the links 37 back into the position of Fig. 1, permitting the grills to swing downwardly into the substantially upright position shown in Fig. 1 by virtue of their own weight.

Figure 12:
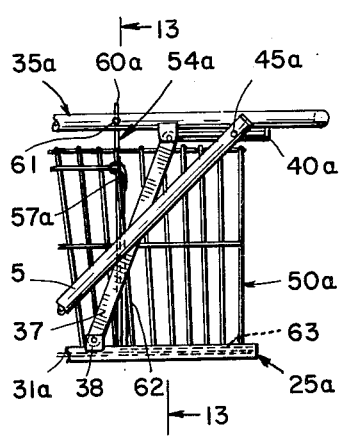
Fig. 12 is a fragmentary side elevation showing a modified form of my invention.
Figure 13:
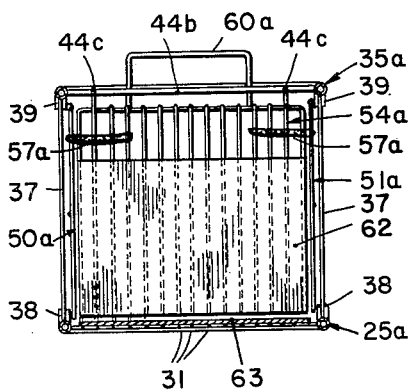
Fig. 13 is a section taken on line 13—13 of Fig. 12.

In Figs. 12 and 13 I show a modified form of cart wherein the parts are as before described except that here I provide a seat and back rest for seating an infant while the cart is in use. Here the rear grill 54a is pivoted at 44c to a cross bar 44b secured at its ends to frame members 35a by screws 61 at a point forwardly of the rear end, and a solid sheet of material 62 is carried by the rear end grill 54a to swing therewith, and to form a back rest. Also a seat is provided by a solid sheet 63 attached to the floor 31. The rear cross-bar 44 is pivotally secured to frame members 5 by screws 45a, the cross-bar sliding on the guide bar 40a. The side grills are denoted 50a, 51a, respectively, and the rear end grill is resiliently connected to the side grills by coil springs 57a preferably sheathed in rubber tubing. The bottom frame carrying the floor grill is denoted 25a.

I claim:
1. A utility cart comprising mobile side frame members, a substantially horizontal floor pivotally secured intermediate its ends to the side frame members, a substantially horizontal top frame swingably supported above and from the floor to swing relative thereto, means slideably connecting the upper end portions of the side frame members to the top frame including a guideway carried by and disposed parallel with said top frame members and a cross bar carried by said side frame members for sliding movement along said slideway, and side and end walls swingably suspended from the top frame.

2. A utility cart comprising mobile side frame members, a substantially horizontal floor pivotally secured intermediate its ends to the side frame members, a substantially horizontal top frame swingably supported above and from the floor to swing relative thereto, means slideably connecting the upper end portions of the side frame members to the top frame including a guideway carried by and disposed parallel with said top frame members and a cross bar carried by said side frame members for sliding movement along said slideway, and side and end walls swingably suspended from the top frame, one of said end walls and both of the side walls being movable relative to each other and relative to the floor in response to swinging movement of the top frame relative to the floor.

3. A utility cart comprising mobile side frame members, a substantially horizontal floor pivotally secured intermediate its ends to the side frame members, a substantially horizontal top frame swingably supported above and from the floor to swing relative thereto, means slideably connecting the upper end portions of the side frame members to the top frame, and side and end walls swingably suspended from the top frame, one of said end walls and both of the side walls being movable relative to each other and relative to the floor in response to swinging movement of the top frame relative to the floor, only when the rear end wall is swung upwardly from between the side walls.

4. A utility cart comprising a pair of parallel diagonally upwardly disposed side bars, a U-shaped base bar secured at its closed end to the side bars, wheels mounted on the bottom ends of the side bars and on the base frame, a normally substantially horizontally disposed floor pivoted between its ends to the side bars between the ends of the latter whereby to be swingable into position substantially parallel with said bars, a substantially horizontally disposed top frame slideably connected adjacent one of its ends to the upper end portions of the side bars, rigid links supporting the top frame from and above the floor and pivotally connected at their respective ends to the top frame and floor whereby to permit the top frame to swing relative to the floor into position substantially parallel with the side bars, and side and end walls swingably suspended from the top frame.

5. A utility cart comprising a pair of parallel diagonally upwardly disposed side bars, a U-shaped base bar secured at its closed end to the side bars, wheels mounted on the bottom ends of the side bars and on the base frame, a normally substantially horizontally disposed floor pivoted between its ends to the side bars between the ends of the latter whereby to be swingable into position substantially parallel with said bars, a substantially horizontally disposed top frame slideably connected adjacent one of its ends to the upper end portions of the side bars, rigid links supporting the top frame from and above the floor and pivotally connected at their respective ends to the top frame and floor whereby to permit the top frame to swing relative to each other and to the floor into collapsed position in response to the last named movement of the top frame.

6. A utility cart comprising a pair of parallel diagonally upwardly disposed side bars, a U-shaped base bar secured at its closed end to the side bars and having its sides disposed divergently therefrom, wheels mounted on the bottom ends of the side bars and on the base frame, a normally substantially horizontally disposed floor pivoted between its ends to the side bars between the ends of the latter whereby to be swingable into position substantially parallel with said bars, a substantially horizontally disposed top frame slideably connected adjacent one of its ends to the upper end portions of the side bars, rigid links supporting the top frame from and above the floor and pivotally connected at their respective ends to the top frame and floor whereby to permit the top frame to swing relative to the floor into position substantially parallel with the side bars, and side and end walls swingably suspended from the top frame.

7. A utility cart comprising a pair of diagonally upwardly disposed side bars, a base frame secured to the side bars, wheels supporting the side bars and base frame, a normally substantially horizontally disposed floor pivoted between its ends to the side bars between the ends of the latter whereby to be swingable into cart collapsing position, a substantially horizontally disposed top frame slideably connected adjacent one of its ends to the upper end portions of the side bars, links supporting the top frame from and above the floor and pivotally connected at their respective ends to the floor and top frame whereby to permit the top frame to swing relative to the floor into cart collapsing position, and side and end walls swingably suspended from the top frame.

8. A utility cart comprising a pair of diagonally upwardly disposed side bars, a base frame secured to the side bars, wheels supporting the side bars and base frame, a normally substantially horizontally disposed floor pivoted between its ends to the side bars between the ends of the latter whereby to be swingable into cart collapsing position, a substantially horizontally disposed top frame slideably connected adjacent one of its ends to the upper end portions of the side bars, links supporting the top frame from and above the floor and pivotally connected at their respective ends to the floor and top frame whereby to permit the top frame to swing relative to the floor into cart collapsing position, and side and end walls swingably suspended from the top frame, one of said end walls normally fitting between the side walls when the cart is not collapsed and being manually swingable out of said position to permit collapsing.

9. A utility cart comprising a pair of diagonally upwardly disposed side bars, a base frame secured to the side bars, wheels supporting the side bars and base frame, a normally substantially horizontally disposed floor pivoted between its ends to the side bars between the ends of the latter whereby to be swingable into cart collapsing position, a substantially horizontally disposed rectangular top frame slideably connected adjacent one of its ends to the upper end portions of the side bars, links supporting the top frame from and above the floor and pivotally connected at their respective ends to the floor and top frame whereby to permit the top frame to swing relative to the floor into cart collapsing position, a pair of side walls pivoted along their top edges to the sides of the top frame to swing upwardly relative to each other, an end wall pivotally secured to one of the ends of the top frame and having its bottom edge engageable with and slideable along the floor during movement of the top frame into said collapsed position, the other of said end walls being pivotally secured along its top edge to the other end portion of the top frame, said last named side wall normally fitting between the side walls and being manually swingable upwardly from said position to permit said side walls to swing upwardly toward each other.

10. A utility cart comprising a pair of diagonally upwardly disposed side bars, a base frame secured to the side bars, wheels supporting the side bars and base frame, a normally substantially horizontally disposed floor pivoted between its ends to the side bars between the ends of the latter whereby to be swingable into cart collapsing position, a substantially horizontally disposed rectangular top frame slideably connected adjacent one of its ends to the upper end portions of the side bars, links supporting the top frame from and above the floor and pivotally connected at their respective ends to the floor and top frame whereby to permit the top frame to swing relative to the floor into cart collapsing position, a pair of side walls pivoted along their top edges to the sides of the top frame to swing upwardly relative to each other, an end wall pivotally secured to one of the ends of the top frame and having its bottom edge engageable with and slideable along the floor during movement of the top frame into said collapsed position, the other of said end walls being pivotally secured along its top edge to the other end portion of the top frame, said last named side wall normally fitting between the side walls and being manually swingable upwardly from said position to permit said side walls to swing upwardly toward each other, and means connecting the side walls to the last named end wall whereby to cause the side walls to commence their said swinging movement in response to said swinging movement of the last named end wall.

11. A utility cart comprising a pair of diagonally upwardly disposed side bars, a base frame secured to the side bars, wheels supporting the side bars and base frame, a normally substantially horizontally disposed floor pivoted between its ends to the side bars between the ends of the latter whereby to be swingable into cart collapsing position, a substantially horizontally disposed rectangular top frame slideably connected adjacent one of its ends to the upper end portions of the side bars, links supporting the top frame from and above the floor and pivotally connected at their respective ends to the floor and top frame whereby to permit the top frame to swing relative to the floor into cart collapsing position, a pair of side walls pivoted along their top edges to the sides of the top frame to swing upwardly relative to each other, an end wall pivotally secured to one of the ends of the top frame and having its bottom edge engageable with and slideable along the floor during movement of the top frame into said collapsed position, the other of said end walls being pivotally secured along its top edge to the other end portion of the top frame, said last named side wall normally fitting between the said walls and being manually swingable upwardly from said position to permit said side walls to swing upwardly toward each other, and means resiliently connecting the side walls to the last named end wall whereby to cause the side walls to commence their said swinging movement in response to said swinging movement of the last named end wall.

12. The device of claim 7 wherein the base frame is comprised of a U-shaped bar, the sides of which diverge toward their free ends whereby to permit of nesting of the base of one cart in the base of another like cart.

13. The device of claim 1 wherein one of the end walls is pivotally suspended from the top frame at opposite points spaced inwardly from the contiguous ends of the side walls.

14. The device of claim 1 wherein the rear end wall is disposed forwardly from the rear end of the floor.

PAUL RUSNAK.

REFERENCES CITED

The following references are of record in the file of this patent:

UNITED STATES PATENTS

| Number | Name | Date |
| --- | --- | --- |
| 2,488,450 | Underwood | Nov. 15, 1949 |
| 2,498,935 | Woods | Feb. 28, 1950 |